No. 841,089. PATENTED JAN. 8, 1907.
J. J. KISER, DEC'D.
F. JONES, EXECUTOR.
ADJUSTABLE CURTAIN FIXTURE.
APPLICATION FILED AUG. 1, 1906.
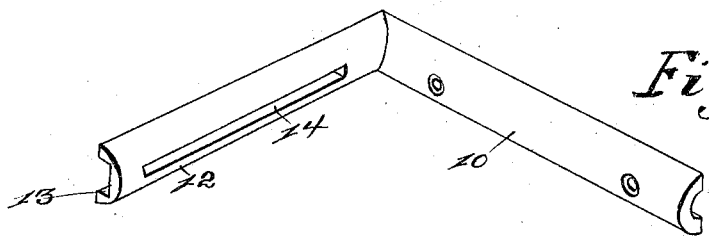
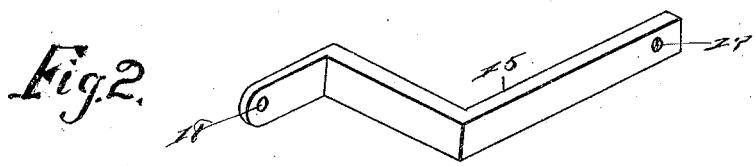
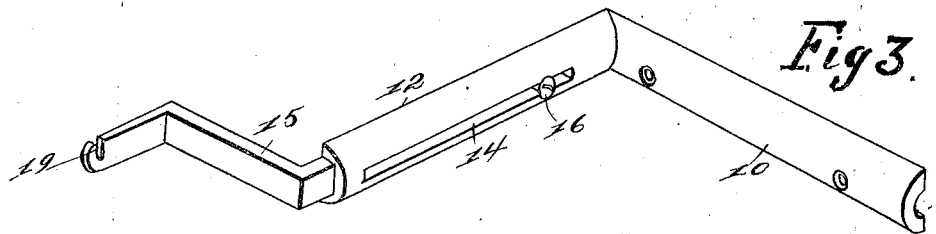
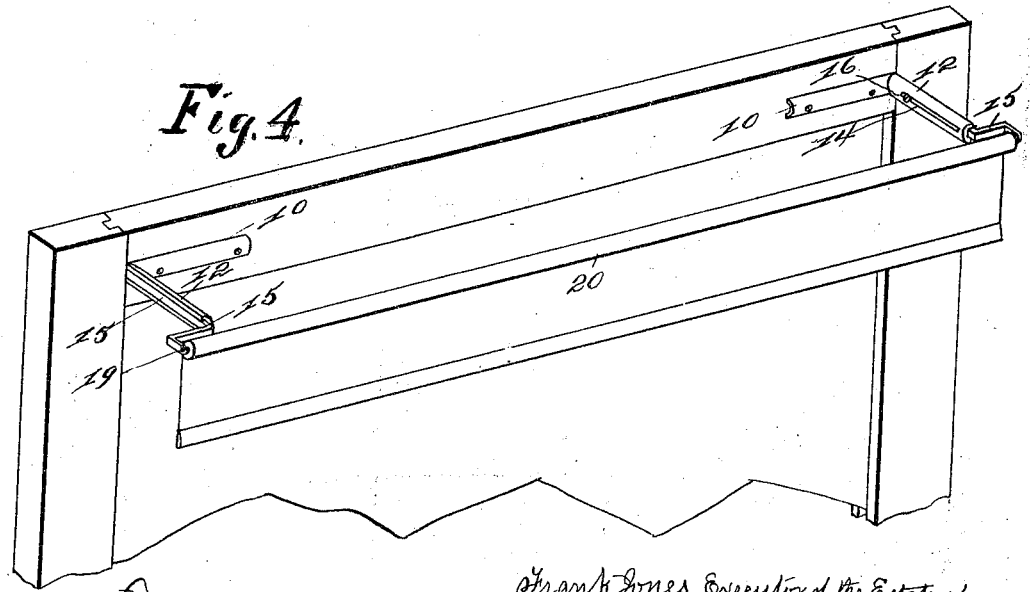

UNITED STATES PATENT OFFICE.

FRANK JONES, OF STANBERRY, MISSOURI, EXECUTOR OF JACOB J. KISER, DECEASED, ASSIGNOR TO WILLIAM E. KISER, OF STANBERRY, MISSOURI.

ADJUSTABLE CURTAIN-FIXTURE.

No. 841,089.     Specification of Letters Patent.     Patented Jan. 8, 1907.

Application filed August 1, 1906. Serial No. 328,805.

*To all whom it may concern:*

Be it known that JACOB J. KISER, deceased, late a citizen of the United States, and a resident of Stanberry, in the county of Gentry and State of Missouri, did invent an Adjustable Curtain-Fixture, of which the following is a specification.

This invention consists in the construction, arrangement, and combination of a main member and a minor adjustable member with a window-sash, as hereinafter set forth, pointed out in the claim, and illustrated in the accompanying drawings, in which—

Figure 1 is a perspective view of one of the main members, and Fig. 2 a corresponding view of one of the minor members. Fig. 3 shows one of the main members and one of the minor members adjustably and detachably connected. Fig. 4 is a perspective view that shows the complete invention applied to a movable window-sash as required for practical use.

The numerals 10 designate the inner ends of the main elbow-shaped member provided with a plurality of screw-holes and adapted to be fixed to a window-sash by means of screws, as shown in Fig. 3. Their outer ends 12 project forward at right angles and have elongated recesses or bearings 13 and slots 14 intersecting the bearings, as clearly shown in Fig. 1. The minor members 15 are double-elbow shaped, and their inner end portions are solid and four sided and fitted in the bearings 13 of the main members 10, and adjustably and detachably fastened therein by screws 16, passed outward through the slots 14 and into screw-seats 17 in the inner end portion of the minor members, as clearly shown in Fig. 3. The outer end of one of the minor members is provided with a journal-bearing 18, and the mating minor member with a slot 19 for supporting a curtain-roller 20, as shown in Fig. 4.

Having thus set forth the purpose of the invention, its construction, and manner of application, the practical operation and utility thereof will be obvious.

What is claimed as new and desired to be secured by Letters Patent is—

An improved window-curtain fixture, comprising an elbow-shaped member having a plurality of screw-holes in one end portion a bearing in the face of its other end portion open at its outer end and an elongated slot intersecting the bearing, a double elbow-shaped member four sided and solid at its inner end portion and provided with a screw-seat and slidable in the bearing of the elbow-shaped member and a screw extended through the slot in the elbow-shaped member into the screw-seat, as set forth.

FRANK JONES,
*Executor of estate of Jacob J. Kiser, deceased.*

Witnesses:
    J. A. MOORE,
    KATIE JONES.